United States Patent [19]

Murbach

[11] 4,447,182

[45] May 8, 1984

[54] FIXING PLUG

[75] Inventor: Julius Murbach, Lindengut 15, 8750 Glarus, Switzerland

[73] Assignees: Julius Murbach; Karl Stüssi, both of Glarus, Switzerland

[21] Appl. No.: 237,580

[22] Filed: Feb. 24, 1981

[30] Foreign Application Priority Data

Mar. 5, 1980 [CH] Switzerland .................. 1744/80

[51] Int. Cl.³ ............................................. F16B 13/10
[52] U.S. Cl. ..................................... 411/45; 411/59; 411/42; 248/635; 405/259
[58] Field of Search ............. 411/46, 44, 45, 50, 411/59, 57, 58, 63, 42, 39, 51, 73, 71; 248/635; 405/259, 260

[56] References Cited

U.S. PATENT DOCUMENTS

| 983,451 | 2/1911 | Kennedy | 411/57 |
|---|---|---|---|
| 1,848,142 | 3/1932 | Peirce | 411/64 |
| 2,120,577 | 6/1938 | Schulte | 411/71 |
| 4,270,434 | 6/1981 | Bucheli | 411/71 |
| 4,287,807 | 9/1981 | Pacaaris | 411/42 |

FOREIGN PATENT DOCUMENTS

| 2403699 | 8/1974 | Fed. Rep. of Germany | 411/64 |
|---|---|---|---|
| 452282 | 5/1968 | Switzerland | 411/63 |
| 584338 | 1/1947 | United Kingdom | 411/42 |
| 1113394 | 5/1968 | United Kingdom | 411/51 |

Primary Examiner—Gary L. Smith
Assistant Examiner—Neill Wilson
Attorney, Agent, or Firm—Werner W. Kleeman

[57] ABSTRACT

A fixing plug contains a metallic expanding sleeve having a slotted end portion or section. Engaging with this slotted end portion is an expanding element which contains a body formed of an oscillation damping material and in which there are embedded a conical sleeve and in axial spacing therefrom a connection element or part. The conical sleeve coacts with the slotted end portion. The connection part serves for the attachment of an attachment screw of the like and for drawing the expanding element into the slotted end portion of the expanding sleeve. At the end portion located opposite the slotted end portion there is arranged an internal lining formed of an oscillation damping material. This internal lining or covering is constructed as an insert body member and possesses a part which protrudes past the expanding sleeve. The fixing plug affords both good attachment properties and good oscillation damping properties.

20 Claims, 4 Drawing Figures

FIXING PLUG

CROSS REFERENCE TO RELATED APPLICATION

This application is related to my commonly assigned copending United States application Ser. No. 141,080, filed Oct. 18, 1979, entitled "Fixing Plug for Attachment of a Threaded Element in a Hole of a Structure", now abandoned.

BACKGROUND OF THE INVENTION

The present invention relates to a new and improved construction of a fixing plug or the like.

Generally speaking, the fixing plug of the present invention is of the type comprising an expanding element which coacts with a slotted end portion or section of a metallic expanding sleeve.

A fixing plug of the previously mentioned type is known to the art, for instance, from Swiss Pat. No. 433,671. What is disadvantageous with this design of fixing plug is that it conducts sonic energy extremely well because of its metallic components.

SUMMARY OF THE INVENTION

Therefore, with the foregoing in mind it is a primary object of the present invention to provide a new and improved construction of a fixing plug which is not afflicted with the aforementioned drawbacks and limitations of the prior art construction discussed above.

Another and more specific object of the present invention aims at providing a new and improved construction of fixing plug of the previously mentioned type which is designed such that notwithstanding its good attachment or fixation characteristics it nonetheless dampens oscillations, and thus, at least dampens the transmission of sonic energy or noise.

A further significant object of the present invention aims at providing a new and improved construction of fixing plug which is relatively simple in construction and design, economical to manufacture, extremely easy to use, reliable in operation, and possesses both good fixation properties and sound damping properties.

Now in order to implement these and still further objects of the invention, which will become more readily apparent as the description proceeds, the fixing plug of the present development is manifested by the features that at least one metallic connection element or part of the expanding element cooperates by means of an oscillation damping material with the expanding sleeve. The expanding sleeve is provided at least at the end section or portion which is located opposite the slotted end section with an inner lining formed of the oscillation damping material and protruding past this end section.

Since at least one metallic connection part of the expanding element cooperates by means of an oscillation damping material with the expanding sleeve, there is beneficially ensured that the sonic energy transmitted by the attachment means to the connection part is not further conducted to the expanding sleeve. At the side of the expanding sleeve facing away from the slotted end portion the inner lining formed of the oscillation damping material, which protrudes past the end portion, likewise serves as a barrier for the further conducting of the sonic energy or noise. Consequently, the fixing plug combines the outstanding attachment characteristics of a fixing plug having metallic expanding sleeve with optimum oscillation damping properties. The term "sonic energy" or "noise" as used in the context of this disclosure is to be understood generally as meaning sonic energy or noise which is conducted through solid elements or parts.

It is possible for the expanding element to coact with the expanding sleeve by means of the oscillation damping material. This design is particularly suitable for simple applications where there are not present any high loads. Also, the oscillation damping material can be arranged as the inner lining of the slotted end portion past which it protrudes. This affords a particularly advantageous construction in those fields of applications where there are not encountered higher loads.

The slots of the slotted end portion of the expanding sleeve in each case can be closed at the end thereof by means of a web serving as a reference fracture location. This design of fixing plug improves the retention of the expanding element in the expanding sleeve.

When encountering greater loads it is advantageous to design the fixing plug such that the expanding element possesses a body member formed of the oscillation damping material. Embedded into the body member is a metallic conical sleeve which coacts with the expanding sleeve and in axially spaced relationship from the conical sleeve there is embedded in the body member the metallic connection element or part.

It is possible for the expanding element to possess a cylindrical portion having axially extending ribs which engage into the slots of the slotted end portion or section of the expanding sleeve. This construction ensures, on the one hand, a certain retention of the expanding element in the expanding sleeve during the storage, the transport and the handling of the fixing plug and, on the other hand, the expanding element is guided in the expanding sleeve such that there is ensured for a uniform tightening of the expanding element during the attachment of the fixing plug. These properties can be further improved in that the conical sleeve possesses a substantially cylindrical sleeve portion which extends at least over a part of the length of the cylindrical part or portion of the expanding element and preferably is provided with an outer layer formed of the oscillation damping material. The cylindrical sleeve portion of the conical sleeve improves the stability and guiding of the expanding element, whereas the outer layer formed of the oscillation damping material counteracts any unintentional release of the expanding element out of the expanding sleeve.

A particularly preferred construction of fixing plug can be obtained if the connection part or element possesses a conical outer jacket or shell which preferably corresponds to the conical inner surface of the conical sleeve. Here, the conical outer jacket or shell of the connection part ensures for a particularly advantageous force transmission to the conical sleeve. Further, the smallest external diameter of the outer jacket of the connection part may have a dimension which at most is as large as the smallest internal diameter of the conical inner surface of the conical sleeve. This design prevents a lower outer edge of the outer jacket from cooperating with the inner surface of the conical sleeve. The largest outer or external diameter of the conical outer jacket of the connection part may be designed to be at least as large as the largest inner diameter of the conical inner surface of the conical sleeve. In this case there is prevented coaction of an upper outer edge of the outer jacket of the connection part with the inner surface of the conical sleeve.

A further possibility of designing the fixing plug is to have the connection part possess an at least approximately cylindrical portion, the outer diameter of which is preferably smaller than the smallest internal diameter of the conical sleeve. This connection part further possesses a radial flange whose outer diameter is preferably larger than the largest inner diameter of the conical sleeve.

The connection part or element can be designed as the head of a screw. It is however advantageous if the connection part is structured as a nut member.

A particularly positive construction of a fixing plug can be obtained if the expanding sleeve is provided with depressions or indentations distributed in the circumferential direction and extending in the lengthwise direction. These depressions are at least partially arranged at the portion of the expanding sleeve which merges with the slotted end portion and preferably are arranged in offset relationship in the circumferential direction with respect to the slots of the slotted end portion. If because there is present a somewhat too large hole or bore in a structure, and consequently, the expanding element can be drawn into the slotted end portion of the expanding sleeve, then by virtue of the aforementioned design there is prevented any further drawing or threading in due to the action of the depressions or the like. In this way there is ensured for a positive attachment of the fixing plug and components arranged thereat. This design of fixing plug also especially affords a secure attachment even in the event of break out of a fire. Even in the presence of a possible charring of the oscillation damping material the depressions or the like ensure that the metallic parts of the expanding element will remain suspended at the depressions.

It is possible for the expanding sleeve to be provided preferably at the slotted end portion at the outer side with a roughened portion, preferably constituted by longitudinal grooves or riffling or the like. This construction prevents rotation of the fixing plug within a drilled or otherwise machined hole.

There advantageously can be used as the oscillation damping material a rubber elastic or elastomeric material. This oscillation damping material can possess a Shore hardness of 65 to 95, preferably about 80 Shore hardness.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
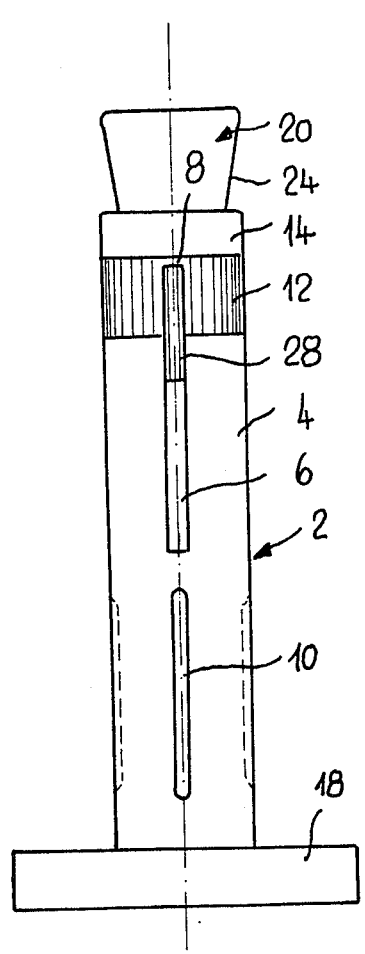
FIGS. 1 schematically illustrates in front view along a longitudinal side a first embodiment of fixing plug according to the invention.
Figure 2:
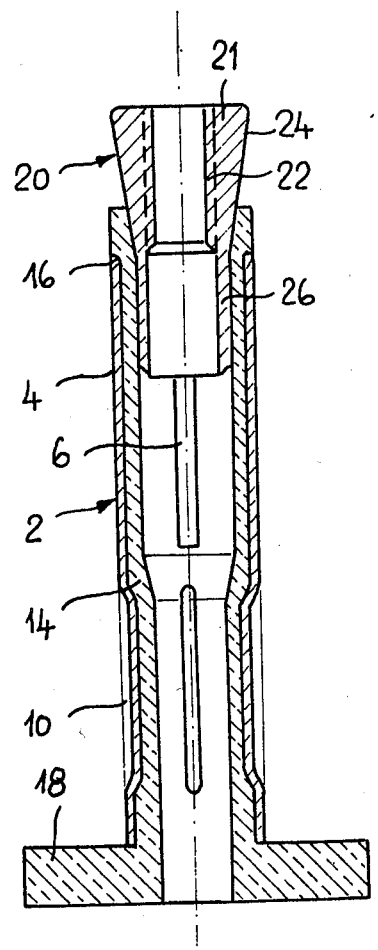
FIG. 2 illustrates the fixing plug of FIG. 1 in longitudinal sectional view.

Describing now the drawings, as will be apparent from FIGS. 1 and 2 the therein illustrated exemplary embodiment of fixing plug comprises an expanding or expandable sleeve or sleeve member 2 having a slotted end portion or section 4. The slots 6 are closed at their free ends by means of a weak web 8 serving as a reference fracture or rupture location. At the portion of the expanding sleeve 2 which merges with the slotted end portion or section 4 there are arranged depressions or recesses 10 extending in the lengthwise direction of the expanding sleeve 2. These depressions or recesses 10 or equivalent structure are distributively oriented about the circumference of the expanding sleeve 2. In the illustrated embodiment the recesses or depressions 10 are located in the prolongations of the slots 6. However, it is also possible to arrange the depressions or recesses 10 in offset relationship with respect to the slots 6, so that the slots 6 and the depressions 10 can overlap in the lengthwise direction. At the upper end of the slotted end portion 4 the expanding sleeve 2 is provided with a roughened surface or roughening 12, which here is constituted by longitudinal grooves or riffling.

The expanding sleeve 2 is provided at its inner side or surface with a lining 14 formed of an oscillation damping material. The lining 14 protrudes beyond the expanding sleeve 2 at the slotted end portion 4. The expanding sleeve 2 is rounded at the inner edge 16 of the slotted end portion or section 4, in order to prevent any damage to the lining or covering 14.

Additionally, the fixing plug possesses an expanding element 20 encompassing a connection portion or part 21 which is structured as a nut member having internal threading or threads 22. The expanding element 20 contains a conical portion 24 and a cylindrical portion 26. The cylindrical portion 26 is provided with a roughened portion or roughening 28 here constituted by longitudinal grooves or riffling. The expanding element 20 is inserted by means of its cylindrical portion or part 26 into the slotted end portion 4. After the insertion of the fixing plug in a bore or hole of an object, for instance a wall, there is introduced for the purpose of attaching a body a screw or equivalent structure into the fixing plug and which screw is connected with such body. The screw is then threaded into the expanding element 20. By tightening the not particularly illustrated threaded screw or the like the expanding element 20 is drawn into the slotted end portion or section 4 and the expanding sleeve 2 is pressed outwardly against the wall of the hole or bore.

Figure 3:
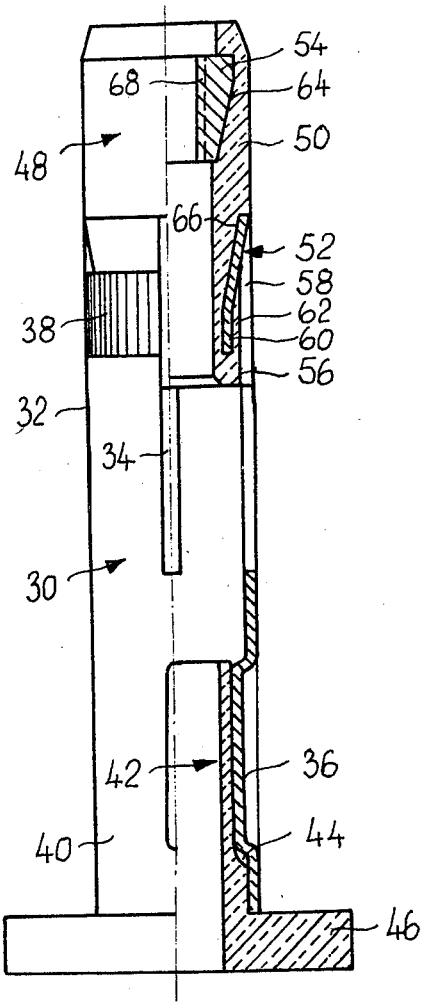
FIG. 3 illustrates a second embodiment of fixing plug in front view along the longitudinal side, wherein one-half thereof has been shown in section.

The embodiment of fixing plug shown in FIG. 3 will be seen to contain an expanding or expandable sleeve or sleeve member 30 having a slotted end portion or section 32. The slots 34 are open towards the end. At the portion of the expanding sleeve 30 merging with the slotted end portion or section 32 there are arranged depressions or recesses 36 or equivalent structure extending in the lengthwise direction of the expanding sleeve 30. These depressions or recesses 36 are distributively arranged about the circumference of the expanding sleeve 30. In the illustrated embodiment the depressions or recesses are in alignment with the slots 34. It is however more advantageous if the depressions or recesses 36 are arranged in offset fashion in the circumferential direction with respect to the slots 34. It is also possible that the slots 34 and the depressions 36 partially overlap in the lengthwise direction. At the open end of the slotted end portion 32 the expanding sleeve 30 is provided with a roughened portion or roughening 38, here again in the form of longitudinal grooves or riffling. This roughened portion 38 prevents rotation of the fixing plug within the drilled hole or bore.

The expanding sleeve 30 is provided at the end portion or section 40 located opposite the slotted end portion 32 with an internal lining or covering 42 formed of a suitable oscillation damping material. This inner lining 42 protrudes past the end portion 40. The inner lining 42 can be structured as an insertable element which is equipped with longitudinal grooves 44 into which engage the recesses or depressions 36. The part 46 of the internal or inner lining 42, protruding beyond the expanding sleeve 30, is constructed as a radially protruding flange.

Furthermore, the fixing plug possesses an expanding element 48 which is inserted at the slotted end section 32 into the expanding sleeve 30. This expanding element 48 primarily comprises a body member 50 formed of an oscillation damping material into which there can be embedded a metallic conical sleeve 52 coacting with the expanding sleeve 30 and in spaced axial relationship from the conical sleeve 52 a metallic connection part or element 54. The expanding element 48 contains a cylindrical portion 56 having axially extending ribs 58 which engage into the slots 34 of the slotted end portion of the expanding sleeve 30. Also the conical sleeve 52 contains a substantially cylindrical sleeve portion 60 which extends at least over a portion of the length of the cylindrical part 56 of the expanding element 48 and is provided with an outer layer 62 formed of the oscillation damping material.

The connection part or element 54 contains a substantially conical outer jacket or shell 64 which preferably is configured to correspond to the conical inner surface 66 of the conical sleeve 52. Preferably the smallest outer diameter of the outer jacket 64 of the connection element 54 at most amounts to the size of the smallest internal diameter of the inner surface of the conical sleeve 52. Furthermore, it is advantageous if the largest outer diameter of the conical outer jacket 64 of the connection element 54 is at least as large as the largest inner diameter of the conical inner surface 66 of the conical sleeve 52. In the embodiment under discussion the connection element or part 54 is designed as a nut member having the internal threads or threadings 68. A not particularly illustrated threaded screw or the like can be threaded from the outside into the connection element or part 54. Upon tightening this screw the expanding element 48 is drawn into the slotted end portion 32 of the expanding sleeve 30 and presses such against the wall of the not particularly shown drilled hole or bore or the like. This screw simultaneously also serves for the attachment of a component or part.

Figure 4:
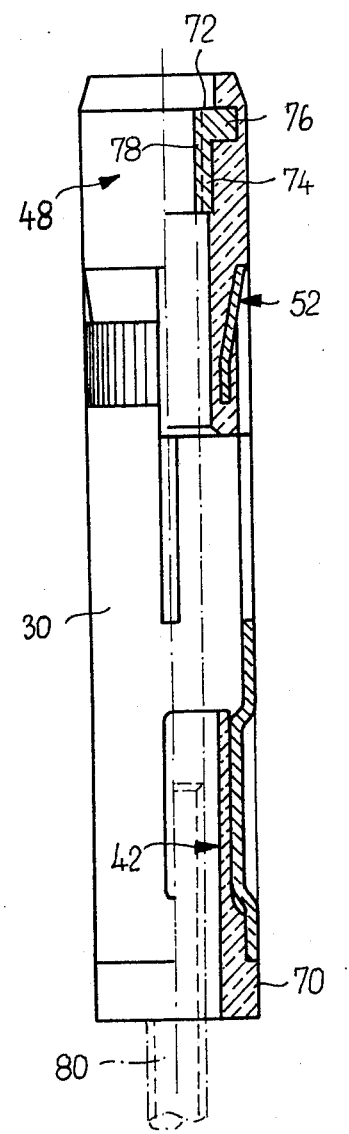
FIG. 4 illustrates a third embodiment of fixing plug in front view along the longitudinal side thereof and half of which has been shown in sectional view.

FIG. 4 illustrates an embodiment of fixing plug which essentially corresponds to the fixing plug of FIG. 3, and therefore, there have been conveniently used essentially the same reference characters to denote the same or analogous components.

The inner lining 42 of the expanding sleeve 30 is however modified in that the radially protruding part 70 flushly merges with the outer surface of the expanding sleeve 30. The expanding element 48 is modified, with this embodiment, in that here it possesses a connection part or portion 72 having an at least approximately cylindrical portion 74 whose outer diameter is preferably smaller than the smallest inner diameter of the conical sleeve 52. Moreover, the connection portion 72 is provided with a radially protruding flange 76 whose outer diameter is preferably larger than the largest inner diameter of the conical sleeve 52. Also, with this embodiment the connection element or part 52 is structured as a nut member having internal threads or threading 78.

With the embodiment of fixing plug as shown in FIG. 4 there has been indicated by chain-dot lines a modification of the connection part 72, wherein here such connection part forms the head of a screw member 80 which has been illustrated in phantom lines.

The parts of the fixing plug which are formed of an oscillation damping material can be constructed, for instance, of a suitable rubber elastic or elastomeric material. Such material may be a natural or synthetic rubber. Good oscillation dampening properties have been obtained when the material possesses a Shore hardness of 65 to 95, preferably about 80 Shore hardness.

While there are shown and described present preferred embodiments of the invention, it is to be distinctly understood that the invention is not limited thereto, but may be otherwise variously embodied and practiced within the scope of the following claims. Accordingly,

What I claim is:

1. A fixing plug comprising:
    an expanding element;
    a metallic expanding sleeve having a slotted end portion;
    said expanding element cooperating with said slotted end portion of said metallic expanding sleeve such that said expanding element can be at least partially axially drawn into the metallic expanding sleeve by means of a screw element connectable with said expanding element;
    said expanding element having at least one metallic connection portion;
    said metallic connection portion of said expanding element cooperating by means of an oscillation damping material with said expanding sleeve;
    said expanding sleeve having an end portion located opposite said slotted end portion;
    at least said oppositely located end portion being provided with an inner lining protruding past said oppositely located end portion and formed of said oscillation damping material; and
    the oscillation damping material comprises an elastomeric material which is arranged as an inner lining of the slotted end portion and protrudes therepast.

2. The fixing plug as defined in claim 1, wherein:
    said expanding sleeve is provided with depressions extending in the lengthwise direction and distributed in the circumferential direction thereof; and
    said depressions at least partially being arranged at the portion of the expanding sleeve merging with the slotted end portion.

3. The fixing plug as defined in claim 2, wherein:
    said depressions are offset with respect to the slots of the slotted end portion in the circumferential direction.

4. The fixing plug as defined in claim 1, wherein:
    said expanding sleeve is provided at the slotted end portion at the outer surface thereof with roughening means.

5. The fixing plug as defined in claim 4, wherein:

said roughening means comprises longitudinal grooves.

6. A fixing plug comprising:

an expanding element;

a metallic expanding sleeve having a slotted end portion;

said expanding element cooperating with said slotted end portion of said metallic expanding sleeve such that said expanding element can be at least partially axially drawn into the metallic expanding sleeve by means of a screw element connectable with said expanding element;

said expanding element having at least one metallic connection portion;

said metallic connection portion of said expanding element cooperating by means of an oscillation damping material with said expanding sleeve;

said expanding sleeve having an end portion located opposite said slotted end portion;

at least said oppositely located end portion being provided with an inner lining protruding past said oppositely located end portion and formed of said oscillation damping material; and the oscillation damping material comprises a rubber elastic material.

7. A fixing plug comprising:

an expanding element;

a metallic expanding sleeve having a slotted end portion;

said expanding element cooperating with said slotted end portion of said metallic expanding sleeve such that said expanding element can be at least partially axially drawn into the metallic expanding sleeve by means of a screw element connectable with said expanding element;

said expanding element having at least one metallic connection portion;

said metallic connection portion of said expanding element cooperating by means of an oscillation damping material with said expanding sleeve;

said expanding sleeve having an end portion located opposite said slotted end portion;

at least said oppositely located end portion being provided with an inner lining protruding past said oppositely located end portion and formed of said oscillation damping material; and said oscillation damping material possesses a Shore hardness in the order of 65 to 95.

8. The fixing plug as defined in claim 7, wherein:

said Shore hardness amounts to about 80.

9. A fixing plug comprising:

an expanding element;

a metallic expanding sleeve having a slotted end portion;

said expanding element cooperating with said slotted end portion of said metallic expanding sleeve such that said expanding element can be at least partially axially drawn into the metallic expanding sleeve by means of a screw element connectable with said expanding element;

said expanding element having at least one metallic connection portion;

said metallic connection portion of said expanding element cooperating by means of an oscillation damping material with said expanding sleeve;

said expanding sleeve having an end portion located opposite said slotted end portion;

at least said oppositely located end portion being provided with an inner lining protruding past said oppositely located end portion and formed of said oscillation damping material;

said expanding element comprises a body member formed of the oscillation damping material which comprises an elastomeric material;

a metallic conical sleeve embedded in said body member and coacting with said expanding sleeve; and a metallic connection portion arranged in axially spaced relationship from said metallic conical sleeve and embedded in said body member.

10. The fixing plug as defined in claim 9, wherein:

said expanding element comprises a substantially cylindrical portion provided with axially extending ribs which engage into slots of the slotted end portion of the expanding sleeve.

11. The fixing plug as defined in claim 10, wherein:

said conical sleeve possesses a substantially cylindrical sleeve portion; and said sleeve portion extending at least over a portion of the length of the cylindrical portion of the expanding element.

12. The fixing plug as defined in claim 11, further including:

an outer layer formed of the oscillation damping material comprising an elastomeric material and provided for said cylindrical sleeve portion of said conical sleeve.

13. The fixing plug as defined in claim 9, wherein:

said connection portion possesses a substantially conical outer jacket.

14. The fixing plug as defined in claim 13, wherein:

said conical outer jacket is structured to substantially correspond in configuration to a conical inner surface of the conical sleeve.

15. The fixing plug as defined in claim 13, wherein:

the smallest outer diameter of the outer jacket of the connection portion at most is as large as the smallest inner diameter of the conical inner surface of the conical sleeve.

16. The fixing plug as defined in claim 13, wherein:

the largest outer diameter of the conical outer jacket of the connection portion is at least as large as the largest inner diameter of a conical inner surface of the conical sleeve.

17. The fixing plug as defined in claim 9, wherein:

said connection portion comprises an at least approximately cylindrical portion and a radial flange.

18. The fixing plug as defined in claim 17, wherein:

said cylindrical portion has an outer diameter smaller than the smallest internal diameter of the conical sleeve and the radial flange has an outer diameter greater than the largest internal diameter of the conical sleeve.

19. The fixing plug as defined in claim 9, wherein:

said connection portion is constructed as a nut member.

20. The fixing plug as defined in claim 9, wherein:

said connection portion is structured as a head of a threaded screw.

* * * * *